(No Model.)
P. DITCHY.
HOISTING APPARATUS.
No. 458,802. Patented Sept. 1, 1891.
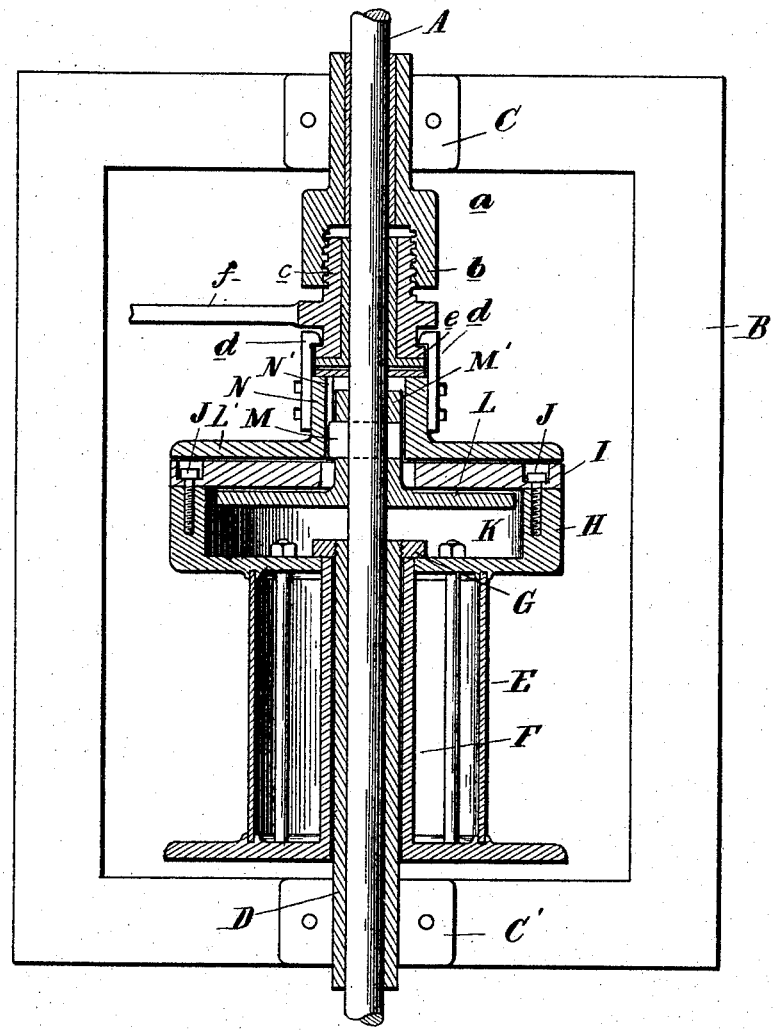
Witnesses:
P. M. Hulbert
M. B. O. Dogherty
Inventor:
Peter Ditchy
By Thos. S. Sprague & Son
Atty.

UNITED STATES PATENT OFFICE.

PETER DITCHY, OF SANDUSKY, OHIO.

HOISTING APPARATUS.

SPECIFICATION forming part of Letters Patent No. 458,802, dated September 1, 1891.

Application filed May 1, 1891. Serial No. 391,264. (No model.)

*To all whom it may concern:*

Be it known that I, PETER DITCHY, a citizen of the United States, residing at Sandusky, in the county of Erie and State of Ohio, have invented certain new and useful Improvements in Hoisting Apparatus, of which the following is a specification, reference being had therein to the accompanying drawing.

This invention relates to new and useful improvements in hoisting apparatus; and the invention consists in the peculiar construction of a winding-drum, the support for the winding-drum, and the clutch mechanism for throwing said drum into and out of connection with the drive-shaft.

The invention further consists in the peculiar construction, arrangement, and combination of the various parts, all as more fully hereinafter described.

In the drawing I show a central horizontal section through my improved hoisting apparatus.

A is the drive-shaft. B is the supporting-frame therefor, provided at each end with suitable journal-blocks C C', which are attached to the frame in any suitable manner.

Secured to the journal-block C' is the elongated bearing or sleeve D. This sleeve may be made integral with the journal-block or may be secured thereto in any suitable manner. It is of such length as to form a support for the winding-drum E, which is journaled thereon and provided with a corresponding tubular bearing F, which preferably extends the entire length of the drum.

G is a ring secured to the inner end of the sleeve F to limit the longitudinal movement of the drum upon the sleeve in one direction.

One of the heads of the winding-drum is provided with an annular flange H upon the outside, to which is secured the friction face-plate I in any suitable manner, preferably by means of the screw-bolts J. This face-plate is centrally apertured to allow the passage therethrough of the shaft A, and the chamber K is formed between this face-plate and the head of the winding-drum.

L L' are friction-flanges upon opposite sides of the face-plate I, the flange L being in the chamber K and adapted to bear against the inner face of the friction-plate, while the flange L' is on the outside and adapted to bear against the outside of the frame.

M is a key passing through the shaft and through the collar M' on the flange L, which extends through the central aperture in the friction-plate bearing upon the shaft. This key also engages in the keyway N, formed in the inner face of a collar N' upon the flange L', such collar fitting over the collar M' of the flange L.

Any suitable means may be employed for clamping the face-plate between the friction-flanges to cause the winding-drum to revolve with the shaft.

In the drawing I have shown the flange L stationarily secured upon the shaft and the flange L' slidingly engaging upon the shaft, and I move the flange L' in and out of contact with the face-plate I by means of the following clutch.

$a$ is a head or collar, preferably formed integral with the sleeve or journal upon the block C.

$b$ $c$ are two parts of a screw, the part $b$ bearing with one end against the head $a$, either formed integral therewith or secured thereto and to the frame in any suitable manner to prevent its rotation. The part $c$ is journaled on the shaft and bears with one end against the end of the sleeve N', being held in contact therewith by the hooked arm $d$, engaging upon the annular flange $e$ on the screw.

$f$ is a hand-lever for turning the parts $c$ of the screw to the right or left. It is evident that turning it in one direction will withdraw the flange L' from the face-plate, and turning it in the other direction will cause the flange L to approach the face-plate and clamp it firmly against the stationary flange L, thereby transmitting to the winding-drum the rotary motion of the shaft. With this construction I get quick action, positive connection, a large amount of bearing-surface for the friction-flanges, and in case the plate I should wear out it could readily be replaced with a new one. I also obtain a wide bearing for the drum itself entirely free from any danger of motion from the shaft within and with little wear in long use.

What I claim as my invention is—

1. In a clutch, the combination of the frame and shaft journaled therein, a drum on the shaft, a friction-plate on the drum, a fixed flange on one side, a longitudinally-movable flange on the opposite side of said friction-plate, and means for moving the movable flange into contact with the plate and the plate into engagement with the stationary flange, substantially as described.

2. The combination of the shaft and winding-drum having a hollow head, a friction face-plate forming a fixed friction-flange on one side thereof, a longitudinally-movable flange on the other side, connection between said flanges and the shaft, and means for moving the movable flange, substantially as described.

3. The combination of the shaft, the winding-drum having a hollow head at one end, a friction face-plate forming one side of said head, a fixed friction-flange inside said head, a longitudinally-movable flange outside thereof, and a screw actuated by a hand-lever for clamping said face-plate between the friction-flanges, substantially as described.

4. The combination, with the winding-drum, of the face-plate I, the flanges L L', having the collars M' N', respectively, the key M, passing through the shaft and collar M', in engagement with a keyway N on the inner face of the collar N', and means for moving the flange L' longitudinally, substantially as described.

5. The combination of the shaft, the head $a$, the screw composed of the parts $b\ c$, one of said parts being stationarily secured in relation to the other, the hand-lever $f$, secured to the movable part of the screw, said part having the annular flange $e$, the hooked arms $d$, engaging the annular flange $e$, and the fixed and longitudinally-movable friction-flanges, substantially as described.

In testimony whereof I affix my signature in presence of two witnesses.

PETER DITCHY.

Witnesses:
JAY L. ANTHONY,
W. E. WEHRLE.